(12) United States Patent
Manning

(10) Patent No.: US 7,388,477 B1
(45) Date of Patent: Jun. 17, 2008

(54) CHAIN COLLISION PREVENTION

(75) Inventor: Roy O. Manning, Melbourne, FL (US)

(73) Assignee: Neway Systems & Products, Inc., Melbourne, FL (US)

( * ) Notice: Subject to any disclaimer, the term of this patent is extended or adjusted under 35 U.S.C. 154(b) by 228 days.

(21) Appl. No.: 11/240,413

(22) Filed: Sep. 30, 2005

(51) Int. Cl.
*B60Q 1/00* (2006.01)

(52) U.S. Cl. .................. 340/441; 340/426.32; 340/438; 340/479

(58) Field of Classification Search ................ 340/441, 340/426.32, 438, 479
See application file for complete search history.

(56) References Cited

U.S. PATENT DOCUMENTS

| | | |
|---|---|---|
| 3,593,278 A | 7/1971 | Bower |
| 3,638,181 A | 1/1972 | Bryant |
| 3,665,391 A | 5/1972 | Bumpous |
| 3,673,560 A | 6/1972 | Barsh et al. |
| 3,710,313 A | 1/1973 | Kimball et al. |
| 3,760,353 A | 9/1973 | Hassinger |
| 3,846,748 A | 11/1974 | Hopwood |
| 3,997,868 A | 12/1976 | Ribnick et al. |
| 4,443,790 A | 4/1984 | Bishop |
| 4,764,978 A | 8/1988 | Argo et al. |
| 4,920,330 A | 4/1990 | Plozner |
| 5,089,805 A | 2/1992 | Salsman |
| 5,461,362 A | 10/1995 | Echt |
| 5,680,122 A * | 10/1997 | Mio ............... 340/932 |
| 5,821,851 A | 10/1998 | Blackmer |
| 5,889,475 A | 3/1999 | Klosinski et al. |
| 5,959,551 A | 9/1999 | Cardillo |
| 6,032,097 A * | 2/2000 | Iihoshi et al. ............. 701/96 |

\* cited by examiner

*Primary Examiner*—Daryl C Pope
(74) *Attorney, Agent, or Firm*—Brian S. Steinberger; Law Offices of Brian S. Steinberger, P.A.

(57) ABSTRACT

Chain Collision Prevention (CCP) includes systems, devices, apparatus for preventing chain collisions and chain reaction crashes, in vehicle columns. A vehicle-installed deceleration indicator and immediately relays and sequentially transmits Closing Alert signals using radio or other media, down the chain of closely following vehicles when deceleration occurs. Vehicle operators are alerted by alarms and warnings, Cruise Controls can be automatically turned off, and radios silenced. The Closing Alert signals can include a display of rearwardly facing blue vertical Rear Warning Light(s), that are visible to both CCP equipped and non-equipped vehicles. One light indicates a vehicle is CCP equipped and is moving forward. Two lights can indicate a vehicle deceleration in the chain of vehicles ahead. Three lights can indicate a stopped vehicle, and flashing can be vehicle backing or reversing. Cameras provide images of forward and rearward located vehicles.

12 Claims, 5 Drawing Sheets

OVERVIEW OF CCP NETWORKS

CCD CRUISE CONTROL DISCONNECTOR, WITH CRUISE EASY DEVICE

FIG. 3

CHAIN COLLISION PREVENTION

This invention relates to vehicular traffic, and more particular to systems, apparatus, devices and methods to prevent chain reaction crashes by relaying deceleration of the vehicles down a chain of traveling vehicles such as but limited to conventional land vehicles (automobiles, and trucks) taxiing or aircraft, and vessels on, over, or under water.

BACKGROUND OF THE INVENTION

Chain collisions, also known as "chain reaction crashes," are series of front-to-rear collisions sometimes involving up to several hundred vehicles. Chain reaction crashes are characterized by each vehicle decelerating successively, an independent unit in an accelerating wave of compression which moves rearward down the column of following vehicles, Typically, all such vehicles are so close that it is nearly impossible for them to avoid colliding with the vehicle ahead, in which case we refer to them here as a chain. In the context of this invention, "chain reaction crash" refers to a series of collisions following from this accelerating wave of compression in a chain or column of hazardously close following vehicles.

Preventing rear-end collisions is a necessary concern. This is a simpler problem than preventing the multiple, simultaneous rear-end collision that is the chain reaction crash. Over the years various types of deceleration sensors/detectors have been used in one vehicle to activate rearwardly facing lights in that one vehicle.

Deceleration detection techniques have been proposed in numerous prior art references. See for example, U.S. Pat. Nos. 5,821,851 to Blackmer; 3,593,278 to Bower; 3,638,181 to Bryant; 3,665,391 to Bumpous; 5,461,362 to Echt; 3,760,353 to Hassinger; 3,846,748 to Hopwood; 4,920,330 to Plozner, and 5,089,805 to Salsman. These patents generally use deceleration indicators to actuate rear brake lights.

All of the above patent references generally employ mercury switche, with the exception of U.S. Pat. No. 5,821,851 to Blackmer. Mercury is undesirable since it is the subject of a U.S. environmental initiative and is recognized worldwide as a dangerous environmental pollutant, and mercury is considered to be toxic even if not ingest. Only U.S. Pat. No. 3,593,278 to Bower allows for the possibility of closing internal electrical contacts with a fluid other than mercury. No information on such a fluid is provided. U.S. Pat. No. 3,846,748 to Hopwood and U.S. Pat. No. 5,089,805 to Salsman use multiple mercury switches which worsen the hazards.

As U.S. Pat. No. 3,665,391 to Bumpous notes, existing brake lights are barely visible in the daytime because of their low candlepower. Nevertheless, all the above U.S. Patents use existing brake lights to provide warnings to other vehicles, illuminating them by brake pedal action as well as by means of deceleration detection. To correct the problem of brake lights being insufficiently visible in daylight, the Bumpous patent employs the vehicle's horn to warn of sudden stops. However, it is doubtful that a following vehicle would hear the horn of a vehicle ahead.

Generally, the deceleration indicators described in the above patent references are complicated and expensive. See for examples U.S. Pat. Nos. 5,821,851 to Blackmer; 3,638,181 to Bryant; 3,846,748 to Hopwood; 4,920,330 to Plozner; and 5,089,805 to Salsman. Expensive complicated techniques are clearly undesirable.

Several devices in the prior art rely only on deceleration detection to alter standard brake light display. See for example, U.S. Pat. Nos. 5,461,362 to Echt and 3,760,353 to Hassinger. The Echt's device causes a vehicle's brake lights to flash in response to a pre-set amount of "panic braking." However, flashing brake lights universally indicate that a vehicle is proceeding slowly, not stopping, so this is misleading. Hassinger's device causes brake lights to flash continuously once deceleration reaches a pre-set point. This has the same defect as Echt's patent, namely, the flashing brake lights only indicate that a vehicle is going slowly, not decelerating. Therefore, neither Hassinger's nor Echt's devices would be effective to ward off overtaking vehicles. Hassinger's device also uses an emergency stop light that must be manually reset switch after every deceleration.

U.S. Pat. Nos. 5,821,851 to Blackmer and 3,760,353 to Hassinger discuss the problem that brake lights can illuminate at any contact of the brake pedal, no matter how slight. Blackmer also notes that when slowing and stopping are accomplished by manual transmission downshifting, the brake light is not illuminated i.e., the brake light is not displayed when the transmission is used to slow the vehicle. This can be important because manual transmissions are so used in cars and trucks around the world.

Manual transmissions slow vehicles through use of a supposed "engine brake" applied through the transmission gears. Like Hassinger, Blackmer also notes that brake lights do not indicate whether the brake pedal has been applied with sufficient pressure to be effective. Although Blackmer notes automobiles may slow and stop by downshifting, this reference neglects to discuss the problem of trucks, where downshifting is essential, the almost universal means of braking. Large trucks must practically always be slowed by downshifting, double-clutching, or by use of a variant engine brake, the Jacobs Vehicle System, "Jake Brakes."

Large trucks also use air brakes. Air brakes use a compressor on the truck motor to pressurize a tank. Once pressurized, air from the tank forces the trailer's powerful steel spring brakes off the brake drums, allowing the trailer wheels to turn freely. An operator is able to slow and stop by reducing air pressure in the tank, which allows the springs to compress brake shoes around brake drums. But brake shoes wear rapidly and on downward grades they can "fade" and become ineffective. Additionally, frequent adjustment of the brake shoes is required.

Despite warnings posted on the rear of trucks indicating they have air brakes, automobile drivers rarely understand that trucks with air brakes can stop extremely rapidly, sometimes altogether out of the truck operator's control. This occurs when, for one reason or another, the air brake system loses pressure. This allows its spring brakes to lock up tight. Evidence of this can be seen on almost any highway where heavy brake marks, often diagonally crossing traffic lanes, indicate that trucks have suddenly been braked to a stop. Because of the danger that automobiles will collide with the rear ends of trucks, often sliding beneath them in the process, either because of this drastic braking or because of involvement in a conventional chain reaction collision. The Federal Motor Carrier Safety Regulation (Sect. 393.86) requires truck trailers to have a "rear end protection" bumper, the "ICC bar," and rear-end signs stating, "Warning—Air Brakes."

Another major danger is uncontrolled deceleration from air brakes. Collisions can also result from trucks following other trucks closely in order to save fuel. The vacuum or "draft" behind a truck ahead helps "pull" closely following, "drafting," trucks along.

Another problem is the flicker light effects. Brake lights tend to flicker on and off at the slightest foot-to-pedal contact. The lights are not consistently associated with speed reductions and consequently are largely ignored.

Chair collisions involve additional factors, especially the obscuring presence of other vehicles, perhaps many other vehicles, further ahead. Above prior art patents assume rear brake lights will be seen in time to prevent collisions. But only the operator of the vehicle immediately following can see them, even if displayed in timely fashion, since vehicles further ahead are obscured by those behind them. This is especially the case with large trucks, which entirely obscure vision ahead. Thus, the operators of vehicles forming chains, that is, traveling in dangerously close proximity, are usually ignorant of what is developing ahead of them, even in clear weather.

The exclusive concern of the prior art patents cited above is prevention of a single rear-end collision of a motor vehicles and truck. However, this is a much simpler problem than chain collisions. A rear-end collision involves only two (2) vehicles, one striking the other from the rear, which represents a simple error in judgment on the part of one vehicle operator. On the other hand, a chain collision or "chain reaction crash" refers to the involvement of a multiplicity of vehicles in a multiplicity of collisions, occurring almost simultaneously, and resulting from an accelerating wave of compression moving rearward along a column of vehicles and meeting the vehicles as they move forward. This occurs so swiftly that it cannot be explained in terms of individual error of judgment. It might better be termed a social accident, especially since its consequences can be societal.

Chain collisions are a worldwide problem for vehicles of all types, including taxying or flying aircraft, vessels on, over, or under the water, and solid terrain vehicles. They frequently involve hundreds of vehicles and, world-wide, are extremely costly in lives lost, injuries, and money.

None of the prior art reference singularly or in combination overcome the problems presented above of reducing and preventing plural vehicle chain collisions. Thus, the need exists for solutions to these problems.

SUMMARY OF THE INVENTION

A primary objective of the invention is to provide systems, devices and methods to prevent both rear-end and chain reaction type crashes.

A secondary objective of the invention is to provide systems, devices and methods to relay deceleration of vehicles down a chain of traveling vehicles.

A third objective of the invention is to provide systems, devices and methods to reduce chain reaction crashes that save lives, avoid injuries, and save money.

A fourth objective of the invention is to provide systems, devices and methods that prevents terrorists' use of chain collisions to disrupt traffic or troop movements, or congest traffic in preparation for a bombing.

A fifth objective of the invention is to provide systems, devices and methods to prevent low visibility collisions and accidents.

A sixth objective of the invention is to provide systems, devices and methods to reduce pollution in chains of traveling vehicles by enhancing traffic efficiency.

A seventh objective of the invention is to provide systems, devices and methods to too save energy in chains of traveling vehicles by enhancing traffic efficiency.

An eighth objective of the invention is to provide systems, devices and methods to deter tailgating and/or reckless driving by preserving digital images of offenses.

A ninth objective of the invention is to provide systems, devices and methods to effect safer driving where control of an affected vehicle always remains with the operator/driver.

A tenth objective of the invention is to provide systems, devices and methods to make chain reaction crashes rare.

A eleventh objective of the invention is to provide systems, devices and methods to override cruise controls of vehicles that are tailgating and/or following too closely.

A twelfth objective of the invention is to provide systems, devices and methods that discourage excessive speeding.

A thirteenth objective of the invention is to provide systems, devices and methods that reduces and/or prevents tailgating and following other vehicles too closely.

A fourteenth objective of the invention is to provide systems, devices and methods that override radio/stereos in vehicles to avoid chain reaction crashes and accidents.

A fifteenth objective of the invention is to provide systems, devices and methods to overcome vehicular traffic problems using relatively uncomplicated, common, practical devices.

Chain Collision Prevention (CCP) can include systems, devices, apparatus and methods of using equipment installed in vehicles of all types to make them safer. These include taxying or flying aircraft, and vessels on, over, or under water, as well as conventional land vehicles. Preventing chain collisions expedites traffic by eliminating congestion and disruptions, especially in reduced visibility, and thereby conserves energy and reduces pollution.

Chain Collision Prevention (CCP) can be a major tool for controlling insurgencies and thwarting terrorists, since chain collisions are often used to create national disruptions of traffic, obstruct troop movements, and invalidate elections. Terrorists also commonly use chain collisions to prepare situations in which to detonate explosives.

Central to Chain Collision Prevention (CCP) system installations is a novel deceleration indicator. This device automatically causes a Closing Alert warning signal, transmitted by radio energy, light waves, laser, ultra sound, or other means, to be send rearward whenever deceleration occurs. The Closing Alert signal is received by all vehicles equipped with the CCP system that are part of the same chain of dangerously close vehicles, the Closing Alert signal being instantly passed rearward, from one to another, to all of them. Rearward inter-vehicular transmission of the Closing Alert signal only ceases when the chain of closely following vehicles is broken. Vehicles not dangerously close to a preceding vehicle are said to "break the chain." They do not receive the Closing Alert signal since they are out of the signal's range.

Reception of the Closing Alert protects vehicle operators from the danger of collision with the vehicle ahead by actuating a variety of devices. One such protective device activated by reception of the Closing Alert signal causes the identical Closing Alert signal received from ahead to be instantly propagated from the receiving vehicle's rear, thereby warning and protecting any other vehicle dangerously close behind. Another device activated by reception of the Closing Alert turns off the Cruise Control. Other activated devices within the vehicle alert the operator by a light signal on the dash and a warning bell. The vehicle's entertainment radio system is simultaneously silenced too, if playing. To assure operator attention to the danger ahead and remove still another distraction, all radio-telephone or cell phone transmissions and receptions are similarly blocked when a vehicle is receiving a Closing Alert transmission. Finally, a large, electric-blue colored warning light(s), centrally located at the rear of CCP system-equipped vehicle, illuminates whenever the Closing Alert signal is either received from ahead or propagated to the rear.

If radio energy is the medium of transmission, Closing Alert signal range is a function of the strength of the propagated signal. The signal is propagated rearward to a range appropriate to the vehicle's speed and also its rate of deceleration. If the equipped vehicle decelerates rapidly, or stops altogether, the signal is propagated at maximum range. In general, the faster the vehicle is proceeding when deceleration occurs, the further rearward the Closing Alert signal needs to be propagated in order to allow following vehicles sufficient time to avoid collision. The faster they are going, the more space needed to stop or avoid collision since close following traffic will be traveling at about the same speed. However, when just commencing to accelerate from a stop, or when coming to a stop, a great deal of spaced is needed too since such nearly stopped vehicles are obstacles to other traffic.

As noted, only those vehicles following dangerously closely are within range of the signal. Another way of stating this is to note that only those vehicles in the same chain as the decelerating vehicle will receive the Closing Alert signal. And on receiving it, they instantaneously re-transmit the signal to their own rear.

However, vehicles not dangerously close, i.e., at safe distances behind and therefore out of range of the Closing Alert signal, or unequipped with the Chain Collision Prevention system, are not neglected: they will usually be able see the large, distinctive electric-blue colored light(s) displayed centrally at the rear of any Chain Collision Prevention (CCP) system-equipped vehicle ahead propagating the Closing Alert warning. Thus, they should still become aware when one or more vehicles ahead are decelerating.

While chain collisions appear to be simultaneous, they are actually the result of the progression of a wave of compression moving rearward through the chain of dangerously close vehicles. Thus, instantaneous transmission of automatically generated deceleration warning signals, or Closing Alerts, to all vehicles in the chain, i.e., to all those closely following the decelerating vehicle, is the only way that individual vehicles can escape being caught in the wave of compression racing toward them. It approaches the chain of vehicles at a speed equal to the sum of the individual vehicle's forward speed and the rearward speed of the wave of compression. If the speed at which the wave of compression surges rearward is approximately one-hundred and twenty miles an hours (120 MPH), and a chain of vehicles is advancing at approximately eighty miles an hour (80 MPH), the chain of vehicles is plunging into a catastrophic accident scene at two-hundred miles an hour (200 MPH). It is no wonder that only the rare vehicle escapes such embroilments.

The Chain Collision Prevention (CCP) system can include networks of electrical, magnetic, electronic, photovoltaic, optical, laser, sonic, acoustic, and mechanical devices installed in vehicles of all kinds. Central to the invention is a novel device, a deceleration detector or indicator, and the even more novel use to which it is put. Vehicles traveling dangerously closely, one behind the other, are herein said to form a chain. When any vehicle in this chain decelerates, a Closing Alert warning signal is instantaneously passed rearward in the chain, so all vehicles at risk are simultaneously warned. Operators of vehicles receiving the warning signal are protected by being subject to immediate sound and visual alarms from within their vehicle, and their Cruise Control, cell or radio-telephone and entertainment radios are shut down.

The invention uses a Deceleration detector/sensor and indicator with relay transmitter and receiver in each equipped vehicle. Additionally, the invention can use visual and audible alarm indicators for drivers. Additionally, the invention can use "Cruise Easy," a remotely controlled cruise control or speed governor that overrides a vehicle's cruise control if that vehicle is traveling too closely, and/or a radio override control for overriding a vehicles stereo and/or radio when that vehicle is be communicated the deceleration of other vehicles traveling ahead of its' intended path.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

| List of Reference Numerals | | |
|---|---|---|
| 10 | Control Box A | |
| 20 | CAR | Closing Alert Receiver |
| 40 | CCD | Cruise Control Disconnector |
| 41 | CCC | Conventional Cruise Control |
| 42 | CE | CruiseEasy (a novel, remotely controlled cruise control) |
| 43 | CEA | CruiseEasy Antenna |
| 44 | Sp/RPM | Speed/RPM Sensor |
| 45 | PSpC | Propulsion Speed Controller |
| 50 | CAF | Closing Alert Flasher |
| 60 | CAB | Closing Alert Bell, or connection to speaker of vehicle radio |
| 90 | DI | Deceleration Indicator |
| 100 | Control Box B | |
| 110 | RIC | Rear Image Capture (digital camera) |
| 115 | FIC | Forward Image Capture (digital camera) |
| 120 | SpCAC | Speed-Closing Alert Calibrator |
| 130 | CAT | Closing Alert Transmitter |
| 140 | S/BA | Stopped/Backing Alert, which alters display of electric-blue Warning Light(s) |
| 150 | RWL | Rear Warning Light(s), electric-blue in color |
| 200 | Control Box C | |
| 255 | CAP | Closing Alert Propagation |
| 345 | | Deceleration Indicator Frame |
| 350 | | Cross Bolt Holes |
| 355 | | Bulkhead Bolt Holes |

-continued

List of Reference Numerals

| | |
|---|---|
| 357 | Bulkhead Bolting Flange |
| 360 | Arcuate Tunnel |
| 365 | Inertial Shuttle |
| 370 | Guide Tracks |
| 375 | Inertial Shuttle Wheels |
| 380 | Buffer Spring |
| 385 | Shuttle Stabilizing Leaf Spring |
| 390 | Stabilizing Leaf Spring Securing Screws |
| 400 | Optical Sensor |

The system consists of networks of electrical, electronic, radio, optical (laser), photovoltaic, magnetic, or mechanical devices, as depicted in FIGS. 1 through 6. These devices communicate with other devices in the same vehicle but one of them communicates with other vehicles through propagation of a Closing Alert signal. Each installed device is represented as a numbered box, with a letter indicating the network of which it is a part.

Figure 1:
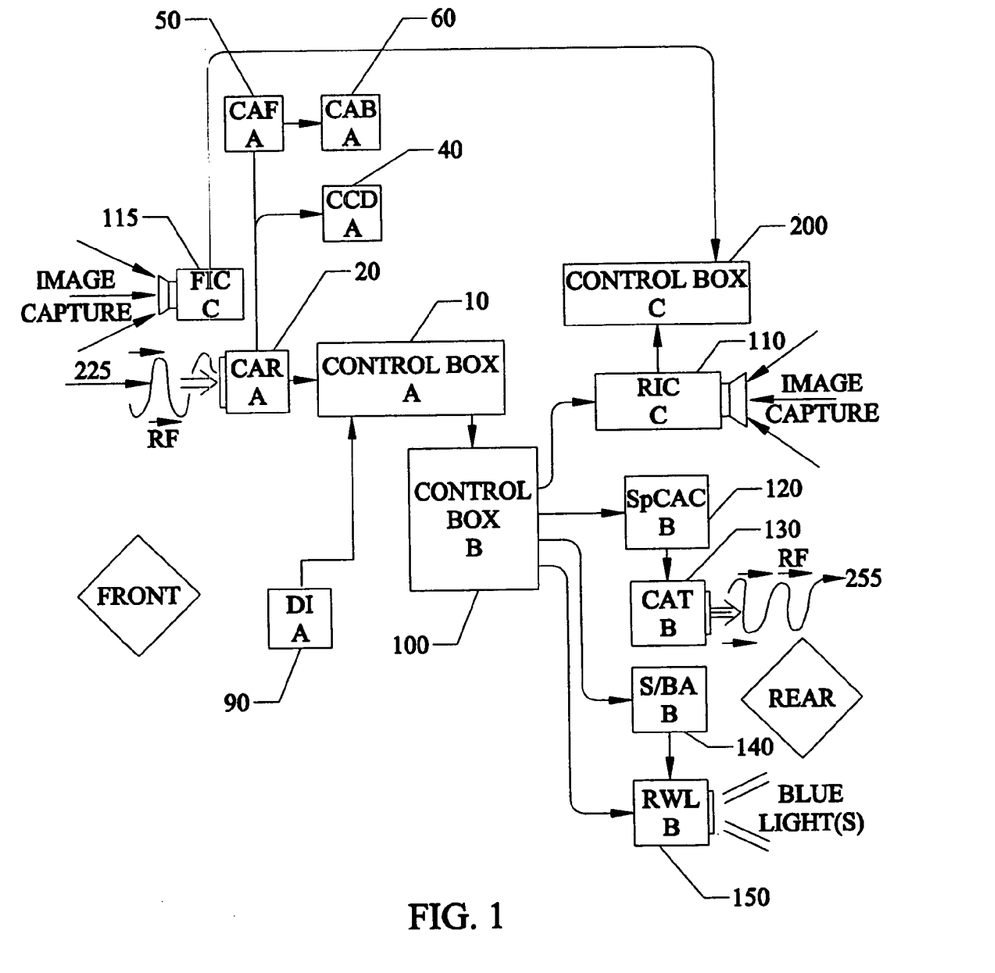
FIG. 1 shows an overview of the novel chain collision prevention (CCP) system network

FIG. 1, OVERVIEW OF CCP SYSTEM NETWORKS, depicts Networks A, B, and C. Network A comprises fifteen (15) devices which display the letter A in their numbered boxes, as shown in FIGS. 1, 2, 3, 4, 5, 6. Control Box A 10 is at the center of Network A; Control Box B 100 is at the center of Network B; Control Box C 300 is at the center of Network C. One device, a Closing Alert Receiver (CAR) 20, points forward. The Closing Alert Receiver (CAR) 20, is connected to a Control Box A 10 and also to a Cruise Control Disconnector (CCD) 40, and two (2) warning devices within the vehicle, a Closing Alert Flasher (CAF) 50, and a Closing Alert Bell (CAB) 60.

Closing the circuit to the Closing Alert Bell (CAB) 60 automatically turns off the receiving vehicle's entertainment radio and its radio telephones. Cell phone communications are similarly blocked. Wiring to accomplish this is simple and is omitted in the drawings. Automatically turning off the entertainment radio assures that its sounds, e.g., loud music, political views, will not prevent the Closing Alert Bell (CAB) 60 being heard, and that the operator will not be distracted in situations when strict attention to the business at hand is appropriate. It also encourages the operator to remain a safe distance from the vehicle ahead, i.e., to keep well behind a collision chain, for otherwise the vehicle radio will be turned off and his cellular telephone will be temporarily shut down.

Figure 2:
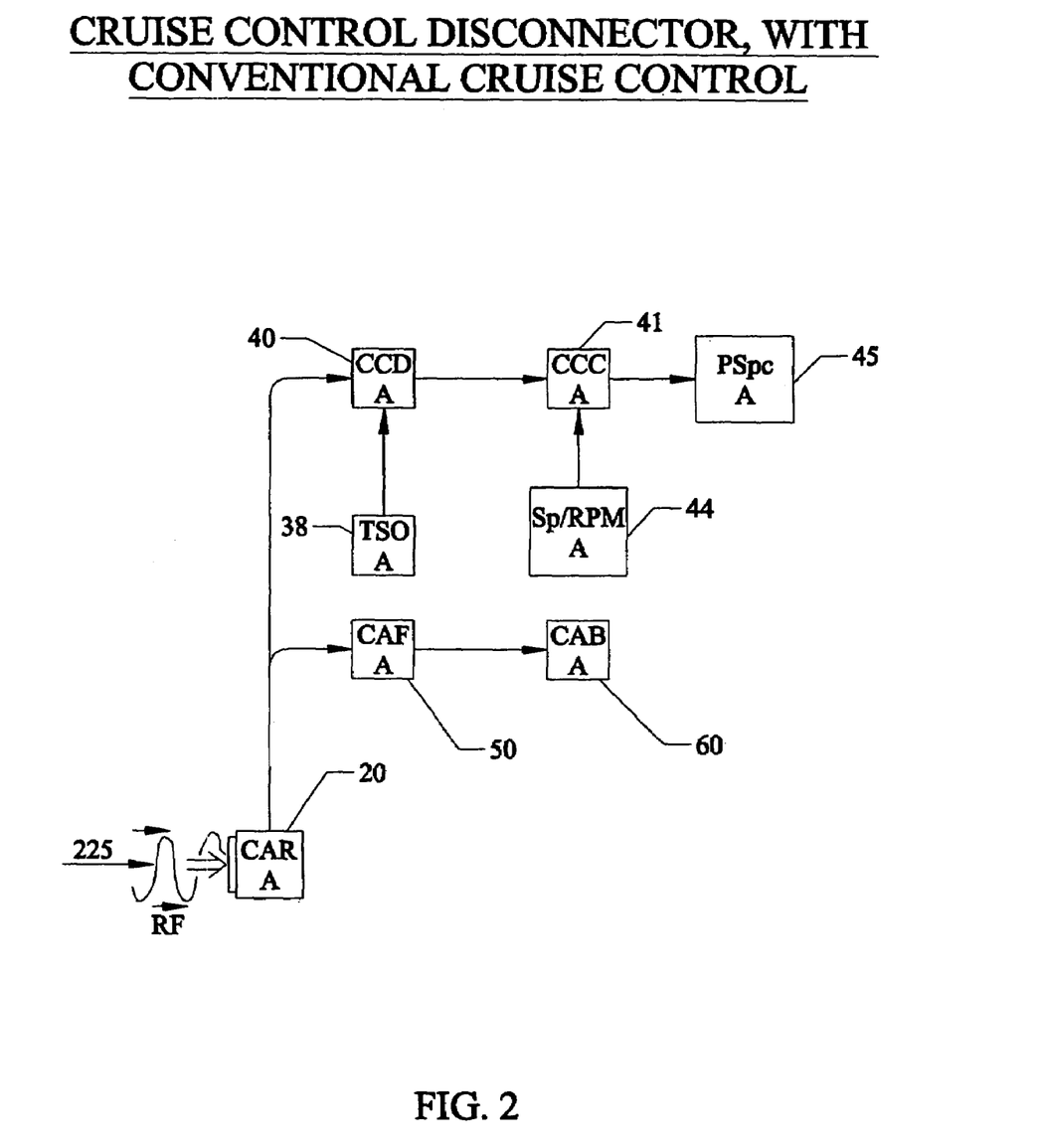
FIG. 2 shows a cruise control disconnector of the invention for disconnecting a conventional cruise control.
Figure 3:
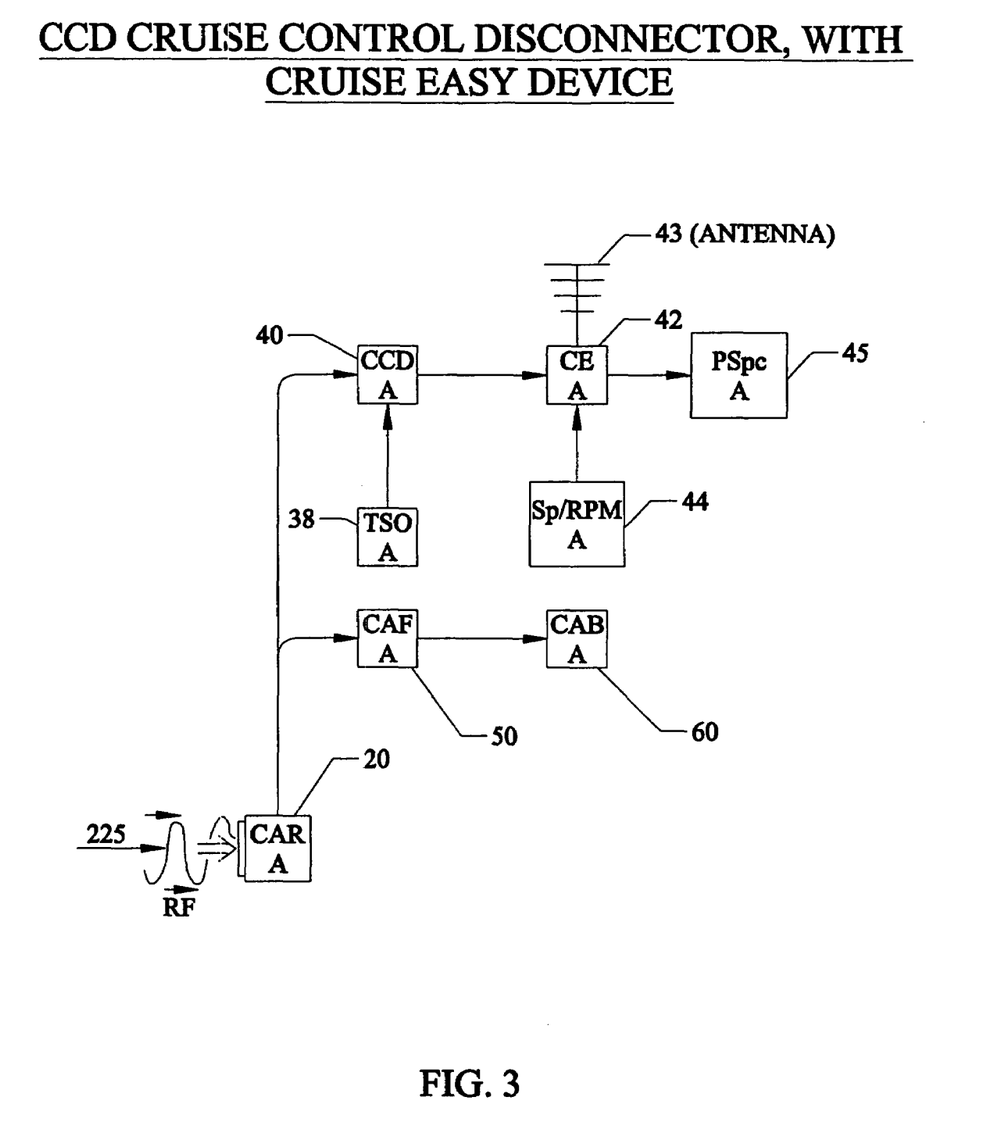
FIG. 3 shows a cruise control disconnector with cruise easy control device.

FIGS. 2 and 3 depict connection options for a Cruise Control Disconnector (CCD) 40, which may or may not incorporate a novel CruiseEasy (CE) 42. The CruiseEasy (CE) 42 is a radio receiver which, when turned on, can set vehicle speed to a Standard Traffic Speed (STS) considered by a local or regional traffic control center appropriate to locale and conditions. It is a novel device that is useful but optional in this particular context.

Network B has a Control Box B 100 at its center and is connected to four (4) other devices, represented by boxes displaying the letter B. These are an electric-blue colored Rear Warning Light(s) (RWL) 150, a Stopped/Backing Alert (S/BA) 140, and a Closing Alert Transmitter (CAT) 130. A Speed-Closing Alert Calibrator (SpCAC) 120 adjusts the strength and thus the range of propagation of the aforementioned Closing Alert Transmitter (CAT) 130. Control Box B 100 is also connected to a Rear Image Capture (RIC) 110. The Closing Alert Transmitter (CAT) 130 is directed rearward. The Rear Image Capture (RIC) 110, also directed rearward, is further connected to a Control Box C 200, which temporarily retains the images captured. Note that the Stopped/Backing Alert (S/BA) 140 is wired to the electric-blue colored Rear Warning Light(s) (RWL) 150 in order to adjusts the light's characteristic display, causing it to flash during backing, for example.

Electric-blue color is specified for the Rear Warning Light(s) (RWL) 150 in order to distinguish CCP system-equipped vehicles from other vehicles. The lamps are large and centrally-located. Day or night display of a single electric-blue colored Rear Warning Light (RWL) 150, whether by day or night, indicates that the vehicle ahead is CCP system-equipped, and is in forward motion.

However, day or night display of two (2) such electric-blue colored lights, one over the other, indicates that one or more vehicle(s) ahead is decelerating. In other words, display of two (2) electric-blue color lights, in vertical alignment, whether by day or night, is the actual deceleration signal. It indicates either that the vehicle ahead is decelerating, or that it is part of a chain of other dangerously close vehicles, one or more of which are decelerating.

When CCP system-equipped vehicle is stopped, whether by day or night, it displays three (3) such electric-blue colored lights, in vertical alignment, that is, one over the other. Finally, when a CCP system-equipped vehicle is backing up (reversing) all three (3) vertically aligned electric-blue colored lights flash rapidly.

FIG. 2, CRUISE CONTROL DISCONNECTOR, WITH CONVENTIONAL CRUISE CONTROL, depicts electrical connections between a Closing Alert Receiver (CAR) 20, a Cruise Control Disconnector (CCD) 40, a Conventional Cruise Control (CCC) 41, a Speed/RPM Sensor (Sp/RPMS) 44, and a Propulsion Speed Controller (PSpC) 45. All are units of Network A.

FIG. 3, CRUISE CONTROL DISCONNECTOR, WITH CruiseEasy DEVICE, depicts electrical connections between the Closing Alert Receiver (CAR) 20, the Cruise Control Disconnector (CCD) 40, the novel, radio-controlled CruiseEasy (CE) 42, a CruiseEasy Antenna (CECA) 43, a Speed/RPM Sensor (S/RPMS) 44, and a Propulsion Speed Controller (PSpC) 45. All are units of Network A. As noted above, the CruiseEasy (CE) 42 incorporates a radio receiver which, when turned on, allows it to be remotely set to whatever Standard Traffic Speed (STS) considered by a local or regional traffic control center to be appropriate for the locale and conditions.

Figure 4:
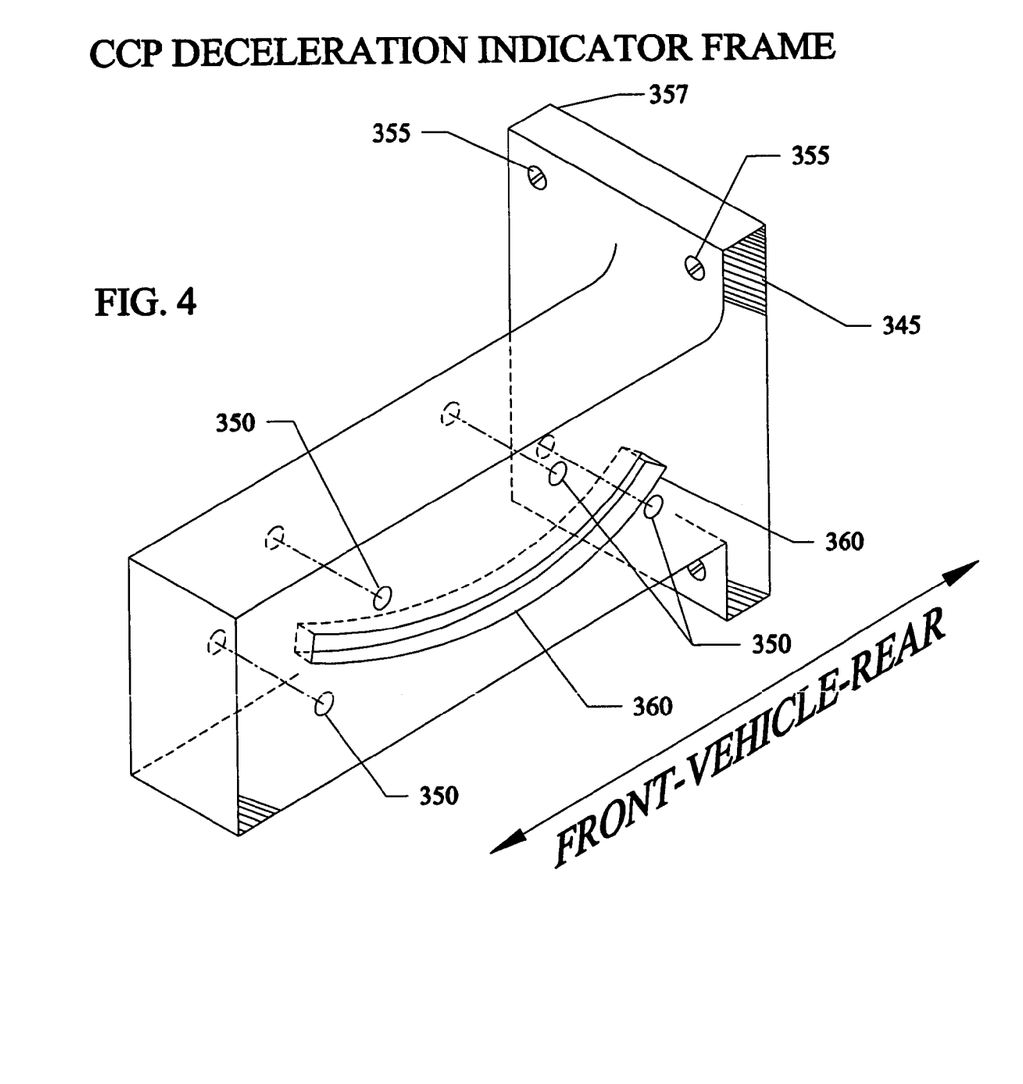
FIG. 4 shows a novel deceleration indicator frame for use with the invention.

FIG. 4, DECELERATION INDICATOR FRAME, depicts one half of a Deceleration Indicator (DI) Frame. The two (2) halves, bolted together, form an assembled Deceleration Indicator (DI) Frame, containing an Arcuate Tunnel 360, lying in a vertical plane parallel to the longitudinal centerline of the vehicle in which it is installed. An Inertial Shuttle, Preferred Embodiment 365, depicted in FIG. 10, is free to roll back and forth within the Arcuate Tunnel 360. The two (2) halves of the preferred embodiment Deceleration Indicator (DI) are held together by four (4) Cross Bolts passing through four (4) Cross Bolt Holes 350. The assembled preferred embodiment Deceleration Indicator (DI) 90, its Inertial Shuttle 365 inside, is securely fastened within the vehicle in a manner equivalent to being bolted or otherwise affixed to a rigid, vertical transverse bulkhead, such as a motor vehicle firewall, or a transverse compartment bulkhead of a ship or aircraft. It is secured to this vertical transverse structure by eight (8) Bulkhead Bolts passing through eight (8) Bulkhead Bolt Holes 355 piercing a Bulkhead Bolting Flange 357.

Figure 5:
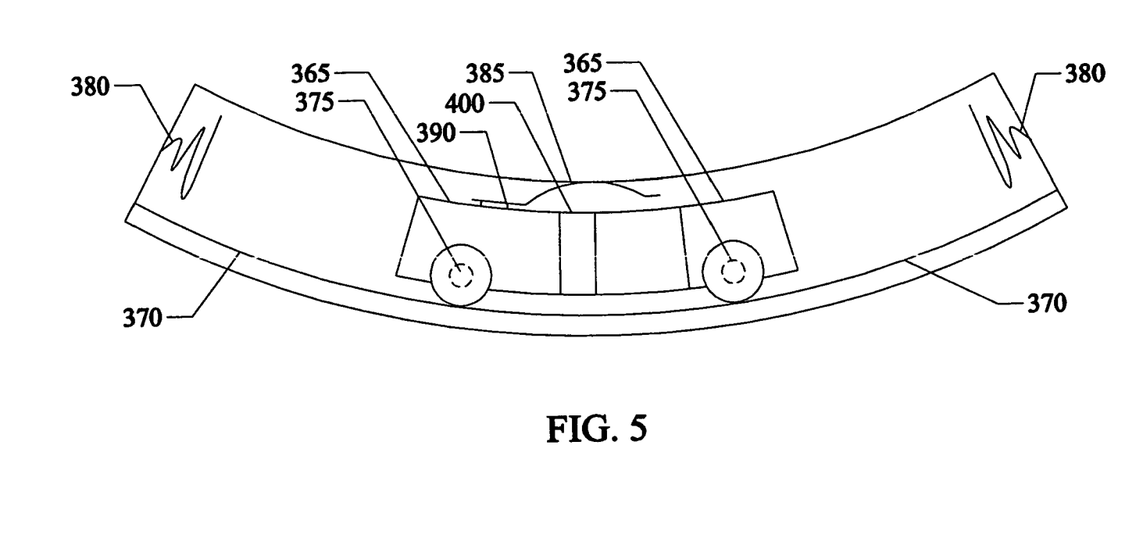
FIG. 5 shows an inertial shuttle device (deceleration detector/sensor) for use with the novel invention.
Figure 5A:
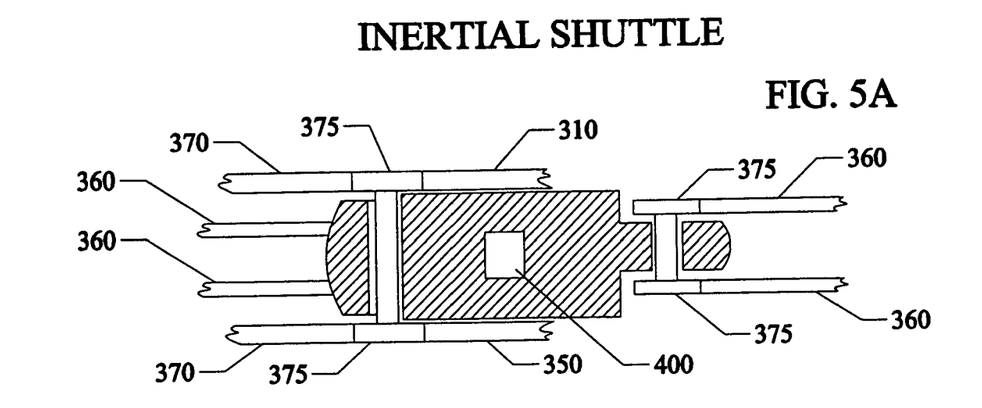

FIG. 5, INERTIAL SHUTTLE, depicts an Inertial Shuttle 365 sitting on its Inertial Shuttle Wheels 375, on Guide Tracks 370, within the Arcuate Tunnel 360. The Arcuate Tunnel 360 is formed when the two (2) grooved halves of the preferred embodiment Deceleration Indicator Frame 345 are bolted together, four (4) Cross Bolts passing through the Cross Bolt Holes 350. The Shuttle Stabilizing Leaf Spring 385 is fastened to the top the Inertial Shuttle 365 by two (2) Stabilizing Leaf Spring Securing Screws 390. At the middle of the Inertial Shuttle 365, an Optical Sensor 400 is secured to point downward, thereby reading, registering, and transmitting the movements of the Inertial Shuttle 365 as it rolls longitudinally, back and forth, within the Arcuate Tunnel 360, in reaction and resistance to movement of the vehicle in which it is installed.

Longitudinal rolling of the Inertial Shuttle 365 is damped by friction between the Shuttle Stabilizing Leaf Spring 385 and the upper interior surface of the Arcuate Tunnel 360. A Buffer Spring 380 is located at each end of the Arcuate Tunnel 360. The respective front and rear Inertial Shuttle Wheels 375 ride on separate tracks to provide electrical conduits by which power is supplied to the Optical Sensor 400, and signals indicating degrees of deceleration or acceleration, can be transmitted from it to Control Box A 10, and the Rapid Halting Sequencer (RHS) 340. The Inertial Shuttle Wheels 375 and tracks are gold plated to facilitate electrical transmission.

Table 1 indicates the distance to the rear to which the Closing Alert signal can be propagated in various situations.

TABLE 1

| Miles Per Hour (MPH) | Range of Closing Alert Between Vehicles (RCA) feet |
|---|---|
| 20 | 60 |
| 30 | 105 |
| 40 | 160 |
| 50 | 225 |
| 60 | 300 |
| 70 | 385 |
| 80 | 480 |

Using radio frequency technology or other transmission mediums, this distance or range will be a function of the strength of the radiated signal but means other than radio energy propagation can be used to transmit the Closing Alert warning. In any case, if the vehicle is going at higher speeds, range of the signal can be adjusted to extend further to the rear to allow following vehicles greater stopping distances. Furthermore, the range of propagation of the Closing Alert signal must increase to its maximum extent whenever higher rates of deceleration occur. The Closing Alert signal continues to be propagated at maximum strength when actual stopping or backing occurs, discontinuing only when substantial (forward) acceleration or a manual switching off of the signal happens.

Chain Collision Prevention (CCP) is a combination of the internal operations of Networks A and B, and external communication with other CCP system-equipped vehicles. The system provides that when a CCP system-equipped vehicle in a chain decelerates, or when it receives a warning Closing Alert transmission from a similarly equipped vehicle ahead that it is decelerating, the receiving CCP system-equipped vehicle instantaneously warns the next vehicle in the chain behind it by re-transmitting the identical Closing Alert warning to its own rear. ("Chain" is defined here as a single line or column of moving vehicles, each vehicle in it following too closely to reliably stop without colliding.)

Thus, any number of vehicles in the chain extending rearward from a decelerating vehicle are instantaneously warned by transmission of the Closing Alert signal. Since the distinctive electric-blue colored Rear Warning Light(s) (RWL) 150 is also displayed whenever a radio electronic warning of deceleration ahead is flashed, then in so far as visibility permits the Rear Warning Light(s) provide advance warning of impending traffic slow downs ahead to those sufficiently to the rear to be out of range, as well as to non-CCP system-equipped vehicles.

FIG. 1. A Deceleration Indicator (DI) 90 is central in the initiation of these rearward warnings. Whenever this device indicates deceleration is taking place, it causes it to send a Closing Alert Propagation (CAP) 255 rearward, to be passed from one vehicle in the chain to another, whether or not any of these other vehicles are themselves decelerating, thereby giving all vehicles in the chain early warning of deceleration ahead. The actual decelerating vehicle might be two-hundred (200) vehicles ahead in the chain. Chain collisions are often massive disasters which obstruct major national arteries for days or weeks.

Vehicles not in a chain, that is, not following closely and therefore out of Closing Alert range, should not receive a Closing Alert Propagation (CAP) 255. They can be said to break the chain of instantaneous deceleration warning since they neither receive nor transmit Closing Alarm Propagation(s) (CAP) 255. However, as noted, visibility and distance permitting, like non-CCP system-equipped vehicles, whether by day or night, these vehicles will certainly perceive the large, centrally located electric-blue colored Rear Warning Light(s) (RWL) 150 displayed at the rear of vehicles that are sending out Closing Alert Propagation(s) (CAP) 255.

The Chain Collision Prevention (CCP) system thus provides warnings that result from either reception of a Closing Alert Propagation (CAP) 255 from ahead, or from simple deceleration, that is, the CCP system-equipped vehicle's own deceleration. Either event sets other processes in train. Non-CCP system-equipped vehicles in the chain will find the sight of deceleration-related electric-blue colored Rear Warning Light(s) (RWL) 150 ahead to be a more reliable warning of impending collision than pedal-actuated brake lights.

The process starts as deceleration is registered by the vehicle's own Deceleration Indicator (DI) 90. The Deceleration Indicator (DI) 90 detects deceleration as a result of the rolling forward of an Inertial Shuttle 365, on Guide Tracks 370, within an interior Arcuate Tunnel 360. The Inertial Shuttle 365 carries an Optical Sensor 400 focused to peer through an aperture in the bottom of the Inertial Shuttle 365. The Optical Sensor 400 reads and reacts to changes in the bottom surface of the tunnel as the vehicle in which the Deceleration Indicator (DI) 90 is installed decelerates. Movements of the Inertial Shuttle 365 send electrical signals of deceleration or acceleration (as a decrease in deceleration) to a Control Box A 10.

Numerous other types of detecting deceleration based on inertia, gravity, or gyroscopic forces and principles, or by use of geographically positioned satellites, can be devised. Mode of deceleration detection is not as important as the use to which information of its occurrence is put.

Further, when Control Box A 10 receives electrical notice of deceleration from the Decelerator Indicator (DI) 90, it passes the same signal to Control Box B 100, whereupon it is passed to an electric-blue colored Rear Warning Light (RWL) 150, a Stopped/Backing Alarm (S/BA) 140, a Speed and Closing Alert Calculator (SpCAC) 120, and a Rear Image Capture (RIC) 110 digital camera. The Stopped/Backing Alert (S/BA) 140 alters the characteristic of the electric-blue colored Rear Warning Light(s) (RWL) 150 display as appropriate, indicating that maneuvers other than deceleration, i.e., being stopped, or backing up, are occurring.

The electric-blue colored Rear Warning Light (RWL) 150 takes the form of three (3) separate lamps, one over the other, centrally located at the vehicle's rear. Illumination of the uppermost electric-blue colored lamp, whether by day or night, indicates that the vehicle is CCP system-equipped and in forward motion. Illumination of the two (2) upper electric-blue colored lamps, whether by day or night, indicates that deceleration is occurring ahead, either on the part of the vehicle immediately ahead or another, one further up ahead in the chain. Illumination of all three (3) vertically aligned electric-blue colored lamps, whether by day or night, indicates that the vehicle immediately ahead is stopped altogether. Reversing or backing up is indicated by a simultaneous flashing of all three (3) vertically aligned electric-blue colored lights.

(An upward moving sequence of illumination, that is, a sequential pattern of display in flashing the three (3) vertically aligned electric-blue colored lights, can be used to indicate a resumption of forward movement, i.e., a modest degree of (forward) acceleration. This would cease or be cancelled when either substantial speed is attained, or when the speed set by the remotely controlled CruiseEasy device is reached.)

The Speed-Closing Alert Calculator (SpCAC) 120 can be electrically informed of the speed of the vehicle and accordingly adjusts the range (distance) that the signal is propagated rearward by the Closing Alert Transmitter (CAT) 130. Assuming radio frequency energy is used for the Closing Alert Propagation (CAP) 255, then the stronger the signal sent, the greater its range, that is, the further it will be propagated. Means other than radio frequency energy transmissions can be used. In any case, the Speed-Closing Alert Calculator (SpCAC) 120 takes into account that the faster a vehicle is going, the greater distance a closely following vehicle will require to stop. This stopping distance is a function of vehicle braking capability and vehicle reaction time, as well as human perception time and human reaction time. Therefore, at higher speeds the Closing Alert Propagation (CAP) 255 will be a stronger signal, one ranging further to the rear, than would be the case at lower speeds.

However, when a vehicle slows to a near stop, or stops altogether, the range of radio warning transmission would be reversed, and increased to its maximum extent. A stopped vehicle in the roadway is an exceptional collision hazard and a warning transmission, such as the Closing Alert Propagation (CAP) 255, is particularly important. See Table 1 OF CLOSING ALERT RANGES FOR VARIOUS SPEEDS. In such instances all the vehicle's lights (i.e., the four-way emergency lights), would automatically be activated.

Whether by day or night, the following events occur in vehicles rearward of the initial decelerating vehicle in the chain:

First, if a following vehicle is not CCP system-equipped, it will not be effected, although, distance and visibility permitting, its operator will certainly see the electric-blue colored Rear Warning Light(s) (RWL) 150 displayed ahead, two (2) of them, one over the other. Besides providing a visual warning.

Note that mere appearance of the electric-blue colored Rear Warning Light(s) (RWL) 150 puts following operators on notice that conduct of their vehicles can become the subject of producible, legal evidence. They are "on camera." This follows from the Rear Image Capture (RIC) 110 digital camera, being activated whenever a CCP system-equipped vehicle sends a Closing Alert Propagation (CAP) 255 to its rear. Furthermore, if the following vehicle is also CCP system-equipped, the Forward Image Capture (FIC) 115 digital camera of that vehicle will also provide such evidence, since this unit automatically commences operation with receipt of a Closing Alert Propagation (CAP) 255, or if any deceleration occurs in the following vehicle itself. Forward Image Capture (FIC) 115 is set in motion by the same sequence of signals: Deceleration Indicator (DI) 90, to Control Box A 10, to Traffic Control Sequencer (TCS) 70, to Control Box C 200, to Forward Image Capture (FIC) 115.

Secondly, if a following vehicle is CCP system-equipped, then reception of a Closing Alert Propagation (CAP) 255 from ahead automatically triggers several other events: (a) the same Closing Alert Propagation (CAP) 255 is instantaneously transmitted from the vehicle's rear: (b) the Conventional Cruise Control (CCC) 41, or the Cruise Easy (CE) 42, if available, is turned off by the Cruise Control Deactivator (CCD) 40, (c) the Closing Alert Flasher (CAF) 50 on the dashboard comes on, (d) the Closing Alert Bell (CAB) 60 on the dashboard sounds. As noted above, activation of the Closing Alert Bell (CAB) 60 automatically silences the vehicle's entertainment radio, if it is playing.

Transport Systems as Terrorist Targets

Disruption of national and regional traffic patterns is obviously the most effective way to cause panic, chaos, and a subsequent general societal breakdown. It can result, in times of war, in military collapse and anarchy. During 1939-1940 the advancing German Wehrmacht paralyzed France by deliberately flooding the streets, roads, and highways with refugees. As much as conventional military action, the resulting paralysis of the national road transportation net, confounding traffic flow, was responsible for the fall of France.

Costs of Highway Obstructions and Stoppages

Collision-caused blockages of major roads and Interstate Highways cost billions of dollars yearly in industrial turmoil and manufacturing delays, beside the loss of life. They are the equivalent of attacks by a small, efficient air force, or of systematic sabotage by a large insurgent organization. Recalling that the Eisenhower Interstate Highway System is a military road system, there could be times when a stoppage of an Interstate Highway could have important strategic consequences. One example is the importance that Interstate Highway 75 had for troop convoys moving down through Georgia to Florida ports during the first Persian Gulf War (1991). Obstruction of this artery by a massive chain reaction crash would have substantially delayed the departure of essential military cargoes.

While a preferred type of deceleration detector/sensor is described, the invention can use other types of deceleration detectors/sensors. For example, the invention can use any of the U.S. Pat. Nos. 5,821,851 to Blackmer; 3,593,278 to Bower; 3,638,181 to Bryant; 3,665,391 to Bumpous; 5,461,362 to Echt; 3,760,353 to Hassinger; 3,846,748 to Hopwood; 4,920,330 to Plozner, and 5,089,805 to Salsman and 5,461,362 to Echt, previously described which are incorporated by reference.

Although the preferred embodiments are described for use with land vehicles, such as cars and trucks, the invention can be used with any type of propelled vehicle such as those used on land, on and under the water, in the air, and in outerspace, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A system for preventing chain reaction crashes between trailing vehicles, comprising:
   a first deceleration detector mounted in a first vehicle, the deceleration detector for detecting a change in acceleration while the first vehicle is traveling;
   a first indicator for directing a visual signal to vehicles behind the first vehicle, the first visual signal indicating the change in the acceleration of the first vehicle, the first visual signal being rearwardly facing lights on the first vehicle which are activated by the change in the acceleration signal from the first vehicle; and
   a first relay transmitter for transmitting the change in the acceleration to a second vehicle which trails the first vehicle by a selected trailing distance;
   a first relay receiver in the first vehicle for receiving another change in acceleration signal of another vehicle located in front of the first vehicle;
   a first forward facing camera on the first vehicle for taking pictures of the another forward located vehicle when the first vehicle trails the another forward located vehicle by the selected trailing distance;
   a first rearwardly facing camera on the first vehicle for taking pictures of the second vehicle when the second vehicle trails the first vehicle by the selected trailing distance;
   a first audible alarm in the first vehicle which activates and alerts a driver of the first vehicle when the first vehicle trails the another forward located vehicle by the selected trailing distance;
   a first cruise control override in the first vehicle which overrides an activated cruise control in the first vehicle to alert the driver when the first vehicle trails the another forward vehicle by the selected trailing distance;
   a second deceleration detector mounted in the second vehicle, the deceleration detector for detecting a change in acceleration while the second vehicle is traveling;
   a second relay receiver in the second vehicle for receiving the change in the acceleration signal from the first vehicle when the second vehicle reaches the selected trailing distance;
   a second indicator for directing a visual signal to additional vehicles following behind the second vehicle, the second visual signal indicating the change in the acceleration of the second vehicle to a third vehicle which trails the second vehicle, the second visual signal being rearwardly facing lights on the second vehicle which are activated by the change in the acceleration signal from the first vehicle; and
   a second relay transmitter for transmitting the change in the acceleration to the third vehicle which trails the second vehicle by the selected trailing distance;
   a second forward facing camera on the second vehicle for taking pictures of the first vehicle when the second vehicle trails the first vehicle by the selected trailing distance;
   a second rearwardly facing camera on the second vehicle for taking pictures of the additional following vehicle when the additional following vehicles trails the second vehicle by the selected trailing distance;
   a second audible alarm in the second vehicle which activates and alerts a driver of the second vehicle when the second vehicle trails the first vehicle by the selected trailing distance; and
   a second cruise control override in the second vehicle which overrides an activated cruise control in the second vehicle to alert the driver when the second vehicle trails the first vehicle by the selected trailing distance.

2. The system of claim 1, wherein the first visual signal and the second visual signal each includes:
   rearwardly facing lights on the first vehicle and the second vehicle which are activated by the respective change in the acceleration signal from the first vehicle and the second vehicle, the rearwardly facing lights being different from any brake lights on the first and the second vehicles.

3. The system of claim 2, wherein the rearwardly facing lights includes:
   rearwardly facing blue lights on the first vehicle and the second vehicle which are activated by the respective change in the acceleration signal from the first vehicle and the second vehicle, the rearwardly facing blue lights being different from any brake lights on the first and the second vehicles.

4. The system of claim 1, further comprising:
   a first radio override in the first vehicle which overrides an activated radio in the first vehicle to alert the driver when the first vehicle trails the another located vehicle by the selected trailing distance; and
   a second radio override in the second vehicle which overrides an activated radio in the second vehicle to alert the driver when the second vehicle trails the first vehicle by the selected trailing distance.

5. An automated deceleration alert relaying system for preventing chain crashes between traveling vehicles, comprising:
   deceleration detectors mounted in trailing vehicles that detect changes in deceleration in their respective mounted vehicles;
   relay transmitters and receivers mounted in the vehicles for relaying detected changes in deceleration sequentially in nonvisual signals down a chain of the trailing vehicles when each trailing vehicle reaches a pre-selected distance behind a forward located vehicle;
   visual and audio alarms mounted in the vehicles which immediately notify each driver of the trailing vehicles when each trailing vehicles reaches the pre-selected distance behind the forward located vehicle, the visual alarms include rearwardly facing lights on each of the vehicles, the rearwardly facing lights being different from any brake lights on the vehicles; and
   forward and rearward facing cameras on each vehicle for taking pictures of forward located vehicles and rearward located vehicles and for activating each vehicles alarm when each of the vehicles trails the forward located vehicles by the pre-selected distance.

6. The system of claim 5, wherein the deceleration detectors detect changes in acceleration selected from the group consisting of: activation of a vehicle brake, vehicle traveling uphill, vehicle traveling downhill, vehicle turning and changes in road surface conditions.

7. The system of claim 5, wherein the visual alarms include:
   blue light indicators.

8. The system of claim 5, further comprising:
an override cruise-control in each vehicle for disengaging an activated cruise-control in each vehicle that receives or detects the change in acceleration.

9. The system of claim 8, further comprising:
an override radio-control in each vehicle for overriding an activated radio in each vehicle that receives or detects the change in acceleration.

10. A method for preventing chain reactions between trailing vehicles, comprising the steps of:
detecting deceleration in at least one vehicle in a chain of vehicles;
visually indicating the deceleration from the at least one vehicle to a trailing vehicle by a rearwardly facing light in the at least one vehicle;
relaying the detected deceleration from the at least one vehicle to an alarm in the trailing vehicle when the trailing vehicle reaches a selected distance behind the at least one vehicle so that a driver of the trailing vehicle is alerted by the alarm;
overriding at least one of an activated cruise-control or a radio in the trailing vehicle when the trailing vehicle reaches the selected distance behind the at least one vehicle; and
relaying the detected deceleration to another alarm in another trailing vehicle when the another trailing vehicle reaches the selected distance behind the trailing vehicle; and
providing forward and rearward facing cameras on each vehicle for taking pictures of forward located vehicles and rearward located vehicles and for activating each vehicles alarm when each of the vehicles trails one the forward located vehicles and the rearward located vehicles by the pre-selected distance.

11. The method of claim 10, wherein the overriding step includes the step of:
overriding both the activated cruise-control and the radio in the trailing vehicle when the trailing vehicle reaches the selected distance behind the at least one vehicle.

12. The method of claim 10, wherein the rearwardly facing light includes:
a different colored light from any brake light on each of the vehicle.

* * * * *